United States Patent [19]

Nagasawa et al.

[11] Patent Number: 5,583,567
[45] Date of Patent: Dec. 10, 1996

[54] DIGITAL IMAGE DATA PROCESSING APPARATUS FOR STORING AND/OR READING DIGITAL DATA AT MULTIPLE RATES

[75] Inventors: Kenichi Nagasawa; Hideaki Kawamura, both of Kawasaki, Japan

[73] Assignee: Canon Kabushiki Kaisha, Tokyo, Japan

[21] Appl. No.: 449,919

[22] Filed: May 25, 1995

Related U.S. Application Data

[63] Continuation of Ser. No. 305,819, Sep. 14, 1994, abandoned, which is a continuation of Ser. No. 203,753, Mar. 1, 1994, abandoned, which is a continuation of Ser. No. 8,875, Jan. 25, 1993, abandoned, which is a continuation of Ser. No. 482,775, Feb. 21, 1990, abandoned.

[30] Foreign Application Priority Data

Feb. 21, 1989 [JP] Japan .................. 1-42779

[51] Int. Cl.$^6$ .................. H04N 5/30; H04N 9/04
[52] U.S. Cl. .................. 348/207; 348/222; 348/418; 348/266; 348/233; 386/124
[58] Field of Search .................. 348/207, 222, 348/231, 233, 262, 265, 266, 268, 272, 289, 293, 220, 571, 390, 391, 394, 409, 410, 411, 412, 414, 415, 417, 418, 909.1; 358/335, 444, 404, 462, 310, 312, 330; 360/13, 39, 35.1, 61, 110.1, 33.1; 369/59; 395/115, 116, 164, 166; H04N 5/30, 9/04, 7/00, 9/07, 9/077

[56] References Cited

U.S. PATENT DOCUMENTS

| | | | |
|---|---|---|---|
| 3,609,227 | 9/1971 | Kuljian | 360/14.1 |
| 3,795,763 | 3/1974 | Golding et al. | 358/13 |
| 4,589,020 | 5/1986 | Akatsuka | 358/160 |
| 4,746,992 | 5/1988 | Hashimoto et al. | 358/310 |
| 4,758,883 | 7/1988 | Kawahara et al. | 358/44 |
| 4,827,357 | 5/1989 | Kawakami | 358/310 |
| 4,872,070 | 10/1989 | Cooper et al. | 360/15 |
| 5,018,017 | 5/1991 | Sasaki et al. | 358/209 |

FOREIGN PATENT DOCUMENTS

2140242  11/1984  United Kingdom ............ H04N 9/32

*Primary Examiner*—Safet Metjahic
*Attorney, Agent, or Firm*—Fitzpatrick, Cella, Harper & Scinto

[57] ABSTRACT

An image storage system for storing in a storage medium digital image data corresponding to an image. An object is imaged and the digital image data are stored in the storage medium according to either of a first storage mode, and a second storage mode, the second digital image data being supplied from outside the system. Thus, it becomes possible to efficiently store digital image data in a storage medium.

27 Claims, 5 Drawing Sheets

DIGITAL IMAGE DATA PROCESSING APPARATUS FOR STORING AND/OR READING DIGITAL DATA AT MULTIPLE RATES

This application is a continuation of application Ser. No. 08/305,819 filed Sep. 14, 1994, which is a continuation of Ser. No. 08/203,753, filed Mar. 1, 1994, which is a continuation of Ser. No. 08/008,875, filed Jan. 25, 1993, which is a continuation of Ser. No. 07/482,775, filed Feb. 21, 1990, all now abandoned.

BACKGROUND OF THE INVENTION

1. Field of the Invention

This invention relates to an image storage system which stores in a storage medium digital data corresponding to an image, and outputs the digital data stored in the storage medium.

2. Description of the Prior Art

Recently, small-sized semiconductor memories having large capacity have been offered relatively inexpensively in accordance with the rapid progress in semiconductor technology. Keeping pace with this situation, in the field of apparatuses for consumer use, there have been produced video cassette recorders (VCR's) utilizing memories (hereinafter termed frame memories) each of which can store color television signals for one picture frame, and the like. There have also been announced electronic cameras of a type in which a memory pack is detachably mounted in a video camera, and color video signals for one field or one frame corresponding to a still picture imaged by the camera are stored in a memory within the memory pack.

If it is intended to increase the number of picture frames which can be stored without increasing the size of a memory pack in this kind of electronic camera, it is necessary to reduce the amount of data for one picture frame. However, since a mere reduction in the amount of data results in a deterioration of picture quality, it is desirable to reduce the amount of data by a high-efficiency coding technique which is well known in the field of digital signal processing.

In accordance with the tendency toward smaller memories having larger capacity and improvements in data compression techniques, it becomes possible to increase the number of still pictures which can be stored within a single memory, and it is expected that the number will become larger.

Suppose that still pictures in the quantity of about 300 picture frames are, for example, stored in one memory pack. When these pictures are dubbed to another memory pack as digital signals, a time of 10 seconds or more is needed even if the dubbing is performed at a rate of 1/30 second for one picture frame. Accordingly, when it is intended, for example, to provide copy of a plurality of memory packs, a long time is required for dubbing. However, if the data rate for write/read is simply increased, it is necessary to match the operation timings of imaging means at the moment of a photographing operation with the timings of a reproduced output for a still picture at the moment of a reproducing operation. Furthermore, digital signal processing at the moment of photographing and reproducing operations must be performed at high speed, and hence the digital signal processing is restricted in time.

SUMMARY OF THE INVENTION

It is an object of the present invention to provide an image storage system which can solve the problems as described above.

It is another object of the present invention to provide an image storage system which can efficiently store digital image data in a storage medium.

These objects are accomplished, according to one aspect of the present invention, by an image storage system for storing digital image data corresponding to an image in a storage medium comprising first digital image data forming means for imaging an object and for forming and outputting first digital image data having a first data rate in accordance with an image of the object which has been imaged, and storage operation control means having a first storage mode for storing the first digital image data output from the first digital image data forming means in the storage medium and a second storage mode for storing second digital image data having a data rate which is higher than the first data rate supplied from the outside in the storage medium, and for controlling the operation for storing the digital image data in the storage medium according to either one of the storage modes.

It is still another object of the present invention to provide an image storage system which can efficiently read and output digital image data stored in a storage medium.

Such an objective is accomplished, according to another aspect of the present invention, by an image storage system for reading and outputting digital image data stored in a storage medium comprising read control means having a first read mode for reading the digital image data stored in the storage medium with a first data rate and a second read mode for reading the digital image data stored in the storage medium with a data rate which is higher than the first data rate, and for controlling the operation for reading the digital image data from the storage medium according to either one of the read modes, and data output means for outputting the digital image data read by the read control means according to the second read mode.

These and other objects and features of the present invention will become more apparent from the following detailed description of the invention with reference to the drawings.

DESCRIPTION OF THE PREFERRED EMBODIMENT

The preferred embodiment of the present invention will now be explained.

Figure 1:
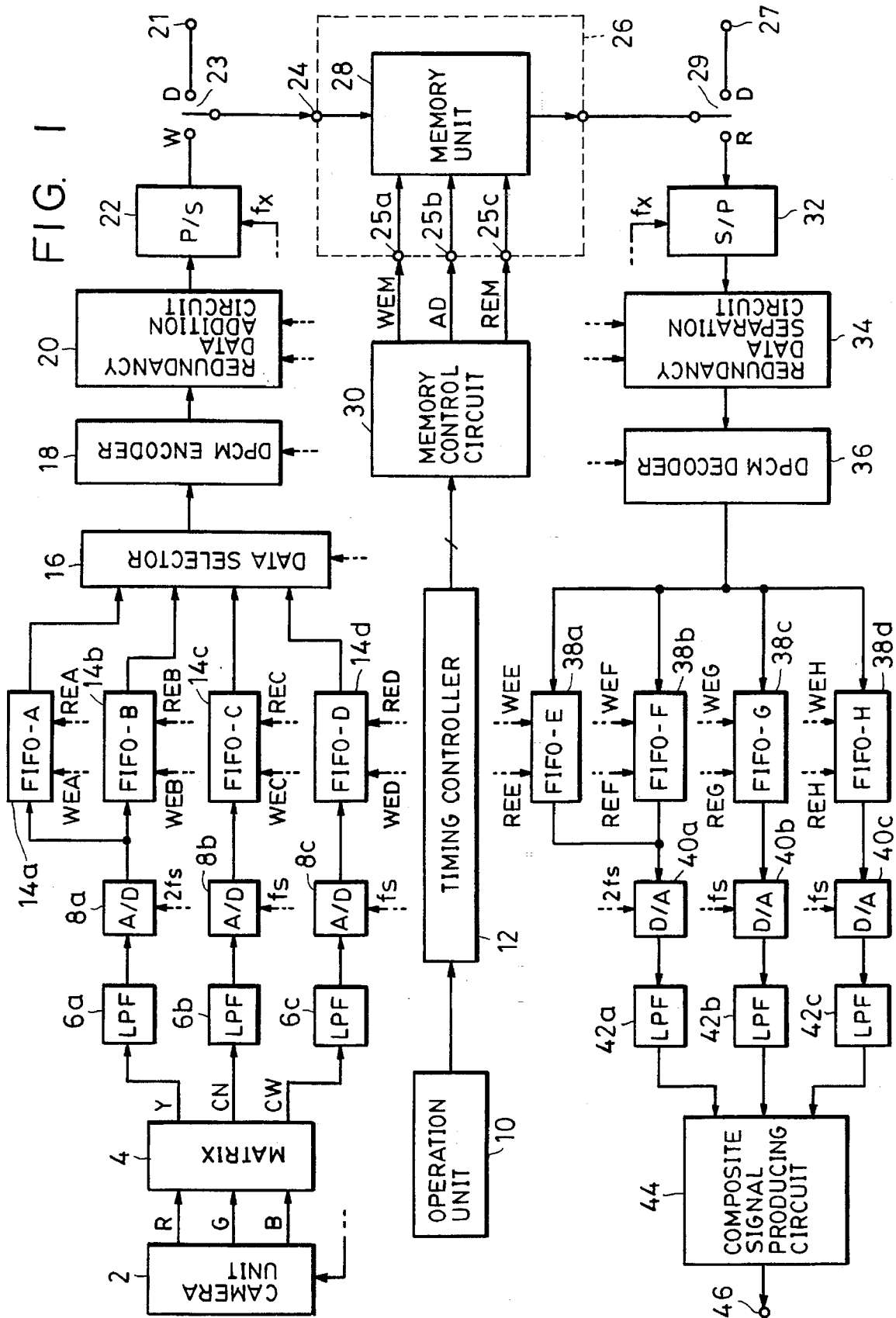
FIG. 1 is a block diagram showing the configuration of an electronic camera according to an embodiment of the present invention.

FIG. 1 is a diagram showing the configuration of an electronic camera according to an embodiment of the present invention in FIG. 1, a camera unit 2 includes imaging means (not shown). A matrix circuit 4 converts signals R, G and B From the camera 2 into a luminance signal Y and color-difference signals $C_N$ and $C_W$. Low-pass filters (LPF's) 6a, 6b and 6c prevent interference with return components produced by sampling at subsequent sampling stages among the signals Y, $C_N$ and $C_W$, respectively. A/D converters 8a, 8b and 8c digitize signals Y, $C_N$ and $C_W$ with sampling frequencies 2 fs, fs and fs, respectively.

Figure 2:
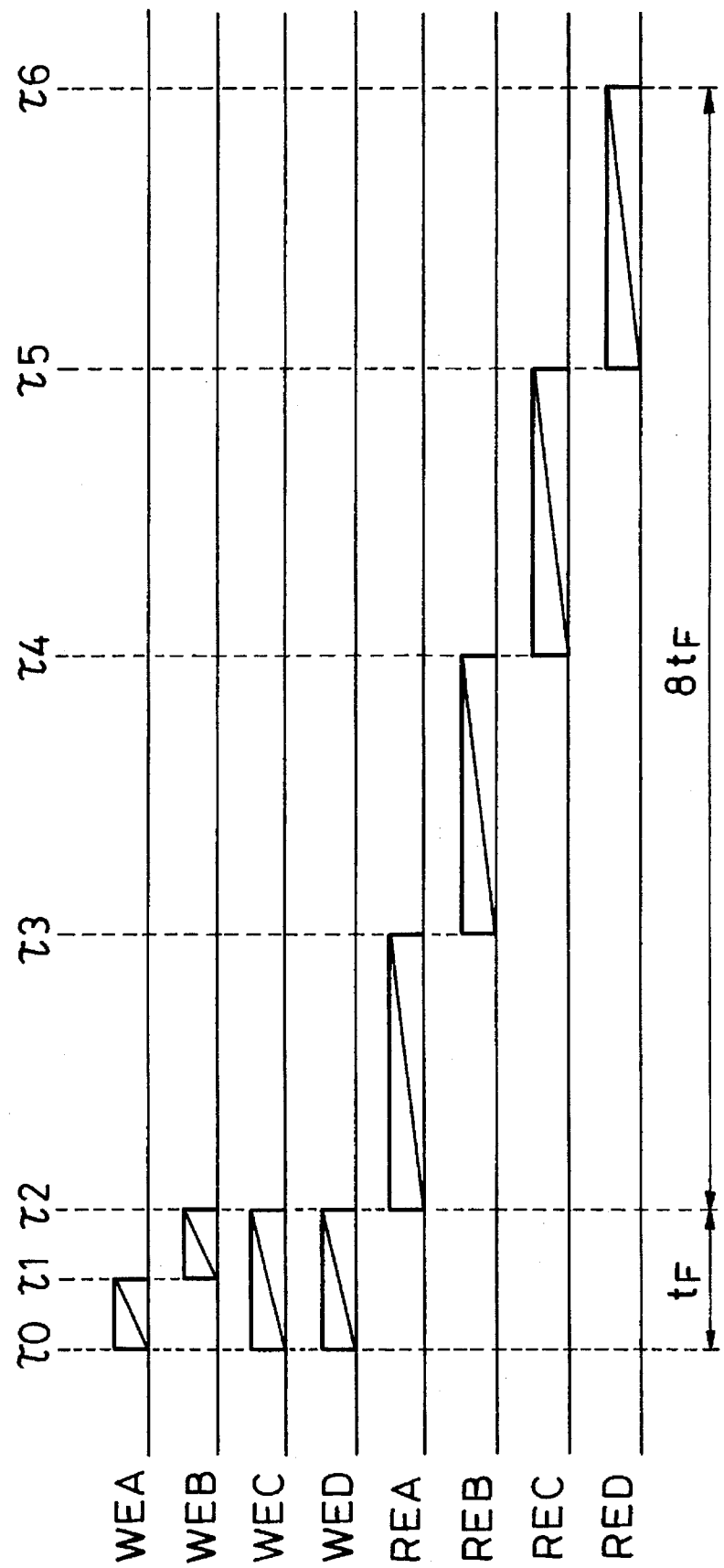
FIG. 2 is a timing chart for explaining the processing in the electronic camera shown in FIG. 1 at the moment of data storage.

FIG. 2 is a timing chart for explaining the operation in the electronic camera shown in FIG. 1 at the moment of data storage (at the moment of photographing an object). The operation at the moment of data storage will now be explained with reference to FIG. 2.

When an operation unit 10 provides a photographing instruction, such as a shutter operation or the like, a timing controller 12 drives the camera unit 2 and the A/D converters 8a, 8b and 8c. The A/D converters 8a, 8b and 8c output a digital luminance signal having a data rate of 2 rs and digital color-difference signals having a data rate of fs, respectively. A luminance signal and color-difference signals for one frame are thereby output from the A/D converters 8a, 8b and 8c, respectively, for every one frame period $t_F$ of a television signal. These signals are written in first-in first-out memories (FIFO's) 14a, 14b, 14c and 14d from a predetermined timing τ0 of the shutter operation. The timing τ0 is set, for example, to a first frame-start timing with which the camera unit 2 can be stably operated after the shutter operation.

The digital color-difference signals $C_N$ and $C_W$ from the A/D converter 8b and 8c are written in the FIFO-C 14c and the FIFO-D 14d during one frame period tF from the above-described timing τ0. The timing controller 12 generates write clock signals having a frequency fs for the FIFO-C 14c and the FIFO-D 14d, and supplies the FIF0-C 14c and the FIFO-D 14d with write enable clock signals WEC and WED during a period $t_F$ from τ0, as shown in FIG. 2

On the other hand, the digital luminance signal Y from the A/D converter 8a is written in the FIFO-A 14a with a write clock signal WEA having a frequency 2 fs during a period ½ $t_F$ from τ0 (up to a timing τ1 in FIG. 2) from τ0, and is written in the FIFO-B 14b with a write clock signal WEB having a frequency 2 fs during a period ½ $t_F$ from τ1 (up to a timing τ2 in FIG. 2). By thus providing FIFO's for respective signals in a number proportional to the sampling frequencies of the respective signals Y, $C_N$ and $C_W$, it is possible to arrange the capacity of each FIFO at an identical amount. This approach is suitable for mass production.

When writing of color video signals for one frame in the FIFO-A 14a–FIFO-D 14d has been completed, reading of a signal from each FIFO is sequentially performed. The frequency of a read clock signal at this time is set to a sufficiently low value so as not to influence the processing at following stages in the present embodiment, it is set to fs/2. Accordingly, a read period from each FIFO becomes 2 $t_F$. That is, as shown in FIG. 2, the FIFO-A 14a, FIFO-B 14b, FIFO-C 14c and FIFO-D 14d perform read operations during $\tau_2-\tau_3, \tau_3-\tau_4, \tau_4-\tau_5, \tau_5-\tau_6$, respectively, and data thus read are supplied to a data selector 16 during a period 8 $t_F$.

The data selector 16 is controlled by the timing controller 12, and sequentially outputs read data from each FIFO during every one frame period. The read out time thereby becomes ⅛th of that required in a case in which the entire data output from the data selector are output during a period of one frame.

The data output from the data selector 16 are supplied to a DPCM encoder 18, where well-known processings, such as differential encoding, quantization and the like, are performed, and a DPCM code is output. Basically, the DPCM encoder 18 can be commonly used for a luminance signal and color-difference signals. In the present embodiment, however, a configuration as shown in FIG. 3 is provided in consideration of a difference in sampling frequency for a luminance signal and a color-difference signal.

Figure 3:
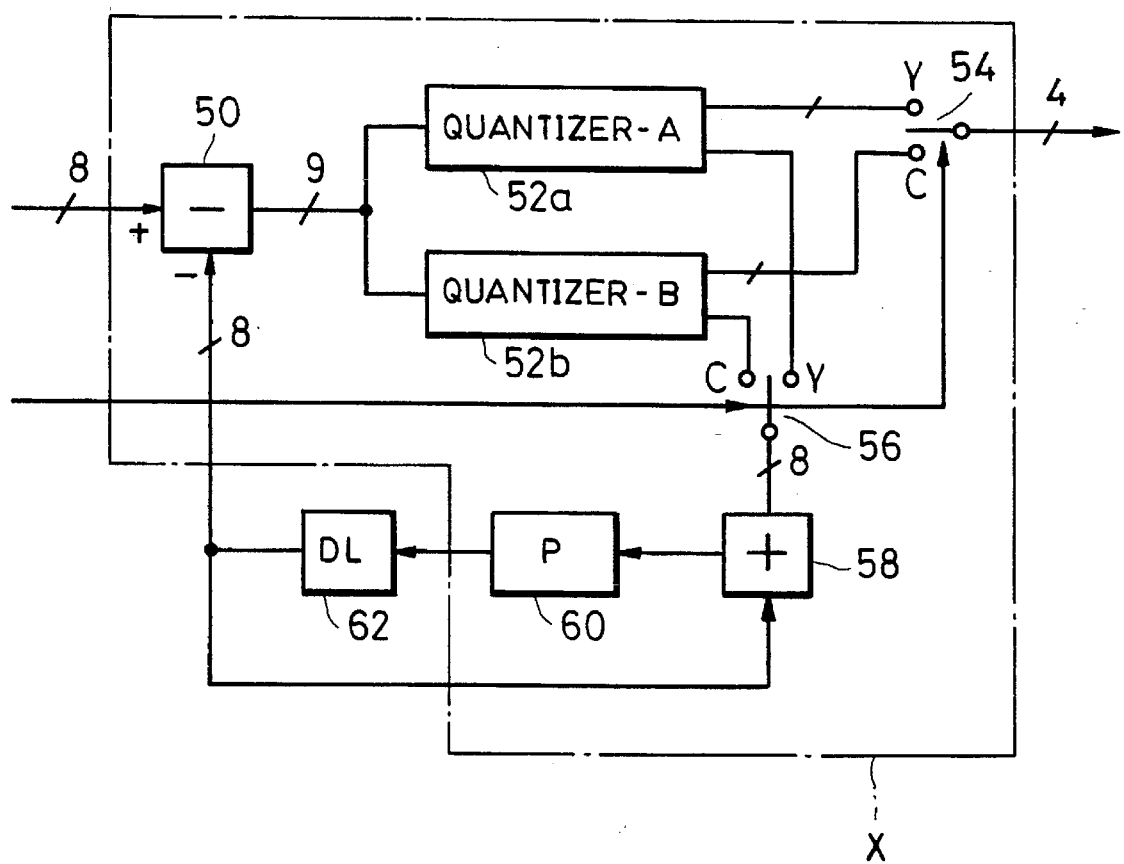
FIG. 3 is a diagram showing the configuration of an encoder in the electronic camera shown in FIG. 1.

In FIG. 3, a subtracter 50 obtains a difference between a sample value and a predicted value. A difference value from the subtracter 50 is supplied to a quantizer-A 52a for a luminance signal and a quantizer-8 52b for a color-difference signal to be subjected to nonlinear quantization. A code quantized at each quantizer is supplied to a data selector 54 controlled by the timing controller 12. Codes output from the quantizer-A 52a are output during a period $\tau_2-\tau_4$ shown in FIG. 2, and codes output from the quantizer-B 52b are output during a period $\tau_4-\tau_6$, respectively, as DPCM codes, On the other hand, the quantizers 52a and 52b supply a data selector 56 with the quantized codes together with representative values obtained by inverse quantization of the quantized codes. Since the data selector 56 is switched in synchronization with the data selector 54, the data selector 56 outputs the representative quantized value which corresponds to the DPCM code output. The quantized representative value is added to the predicted value at an adder 58, and a local decoded value is thus obtained. The local decoded value is multiplied by a predictive coefficient P at a multiplier 60. The resultant value is delayed at a delay unit 62, and the next predictive value is thus obtained.

According to the DPCM encoder having the configuration as described above, it is possible to provide quantization characteristics which are suitable for a luminance signal and a color-difference signal, respectively, and to utilize most parts of the circuitry in common. When a region surrounded by the chain line in FIG. 3 is configured by one read-only memory (ROM), it may be configured by a ROM having an address input having 17 bits which consist of 1 bit from the timing controller in addition to 8 bits for a sampled value and 8 bits for a predicted value.

The DPCM code subjected to data compression at the DPCM encoder 18 is supplied to a redundancy data addition circuit 20, which adds an error correcting code (ECC) and the like. The resultant signal is then serialized at a parallel-serial (P/S) converter 22, and is supplied to an output terminal 24 of the main body of the camera via a W-side terminal of a switch 23. A memory control circuit 30 supplies a write clock signal (WEM) to a memory unit 28 from a terminal 25a to a memory apparatus 26 during a period $\tau_2-\tau_6$ shown in FIG. 2. The memory control circuit 30 supplies address data AD indicating an address for the number for a picture frame defined by the operation of the operation unit 10 or the timing controller 12 from a terminal 52b to the memory apparatus 26.

Thus, the memory apparatus 26 is configured so as to be detachably mounted on the main body of the camera, and stores a color video signal for one frame in an address defined at every shutter operation of the operation unit 10.

Figure 4:
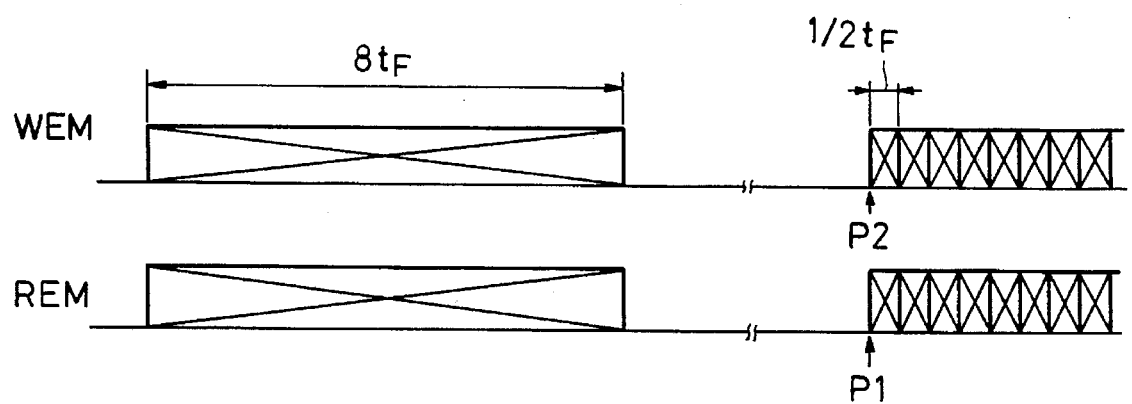
FIG. 4 is a timing chart for explaining the operation a memory control circuit in the electronic camera shown FIG. 1.

Next, an explanation will be provided of an operation in which dubbing is performed between memory units storing digital signals using the electronic camera of the present embodiment. FIG. 4 is a timing chart showing a write clock signal WEM and a read clock signal REM which the memory control circuit 30 in the electronic camera shown in FIG.1 outputs. An explanation will now be provided with reference to FIG. 4.

First, an explanation will be provided of the reading of a still picture from the memory unit 28 at the moment of dubbing. At this time, the memory control circuit 30 repeatedly outputs read clock signals necessary for reading DPCM codes for one frame during every ½-frame period. The number for a picture frame indicated by the address data AD is counted up one by one for every ½-frame period. Data for still pictures stored in the memory pack 28 are sequentially read with the timing with which dubbing reading is started (shown by P1 in FIG. 4). If it is now assumed that n still pictures can be stored in the memory pack 28, the above-described number for a picture frame is counted up from 1 to n. This operation is performed during a period n $t_F/2$ from the timing P1.

Both the switch 23 and a switch 29 are connected to terminal D at the moment of dubbing, and still-picture signals for n picture frames suquentially read as described above are output as DPCH codes from a dubbing output terminal 27.

Next, an explanation will be provided of writing still pictures in the memory unit 28 at the moment of dubbing. The still-picture signals (DPCM codes) for n picture frames read as described above are input from a dubbing input terminal 21, and are supplied to the memory pack 28 via a side-D terminal of the switch 23 and the terminal 24. At this time, the memory control circuit 30 is operated in synchronization with the electronic camera outputting the above-described still-picture signals for n picture frames by means not shown, and repeatedly outputs write clock signals necessary for writing DPCM codes for one frame during every ½-frame period. Similarly, the address data AD which the memory control circuit 30 outputs are controlled so that the number for a picture frame indicated by the address data AD is counted up one by one for every ½-frame period.

The still-picture data for n picture frames sequentially read as described above are successively stored in predetermined addresses within the memory unit 28. This writing operation is completed within a period n $T_F/2$.

At the left side in FIG. 4, there are shown the write lock signal WEM and the read clock signal REM at the moment of normal photographing and reproducing operations. In this case, writing and reading operations for DPCM codes for one frame are separately performed only for one picture frame during a period of 8 $t_F$.

Next, an explanation will be provided of the operation at the moment of the reading operation. When a read instruction is provided by the operation unit 10 after designating an address to be read, the memory control circuit 30 outputs a read clock signal (REM) for data AD indicating the above-described address in the memory unit 28. Video signals for one frame are thus read from the memory unit 28 in the same order as in the writing operation during a period 8 $t_F$.

The serial data thus read are made parallel in a serial-parallel (S/P) converter 32 via side R of a switch 29, are subjected to processing at a redundancy data separation circuit 34, and are then supplied to a DPCM decoder 36. The DPCM decoder 36 has a configuration corresponding to the The DPCM encoder 18. Accordingly, when the DPCM encoder 18 has the configuration as shown in FIG. 3, the DPCM decoder 36 has the configuration as shown in FIG. 5.

Figure 5:
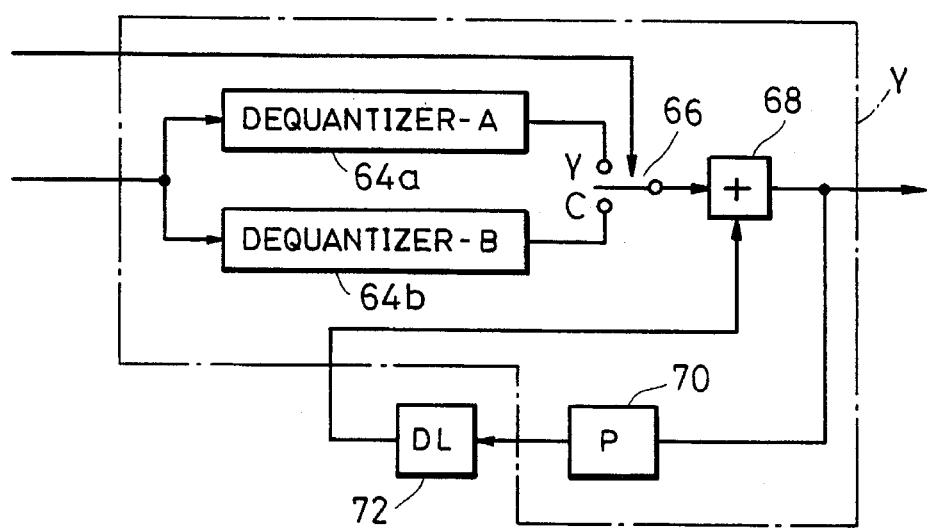
FIG. 5 is a diagram showing the configuration of a decoder in electronic camera shown in FIG. 1.

In FIG. 5, a dequantizer-A 64a and a dequantizer-B 64b have inverse quantizing characteristics which are identical to the dequantizing characteristics of the quantizer-A 52a and the quantizer-B 52b shown in FIG. 3. A data selector 66 outputs an output from the dequantizer-A 64a when DPCM codes for a luminance signal are read from the memory unit 28, and outputs an output from the dequantizer-B 64b when DPCM codes for a color-difference signal are read. Thus, a difference code output from the data selector 66 is decoded at an adder 68, and is output as a decoded value. The decoded value is multiplied by a predictive coefficient P at a multiplier 70, delayed then at a delay circuit 72, and is supplied to the above-described adder 68 as the next predicted value.

Figure 6:
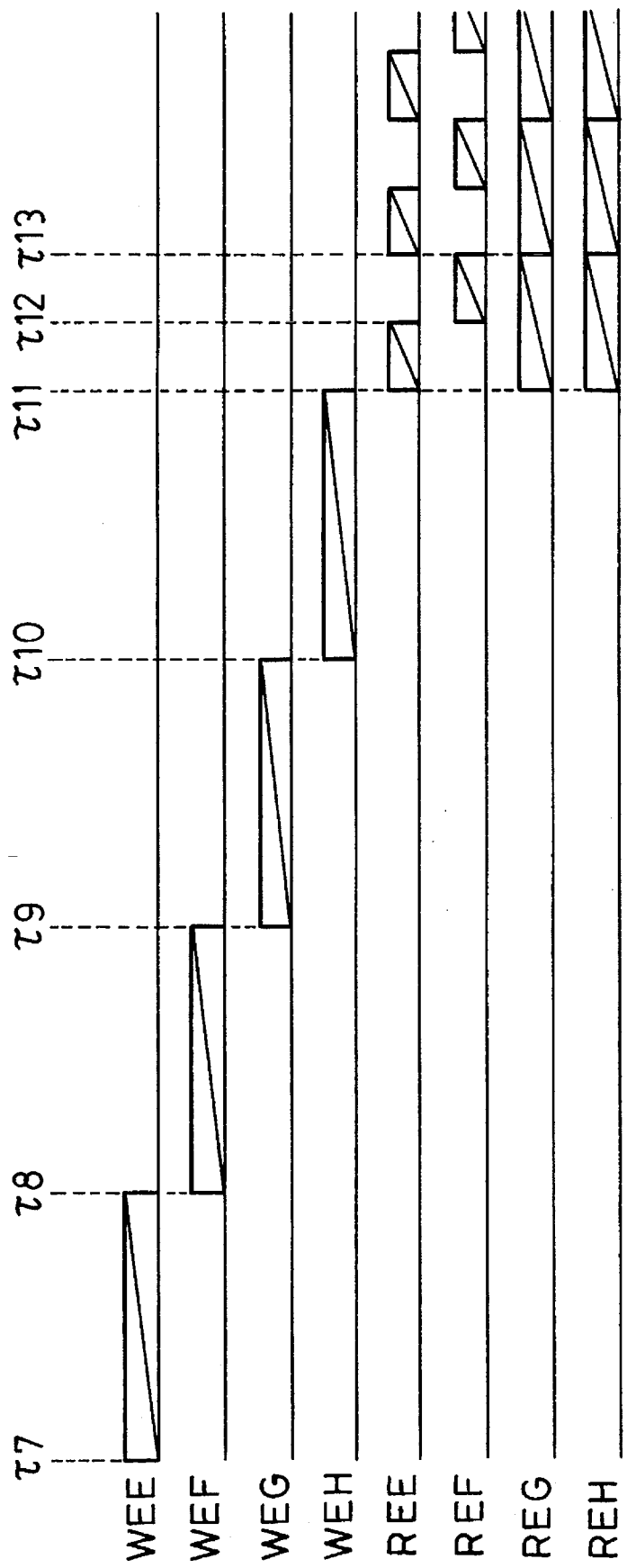
FIG. 6 is a timing chart for explaining the operation when data are read in the electronic camera shown in FIG. 1.

The digital signal decoded by the DPCM decoder 36 is supplied to FIFO-E 38a–FIFO-H 38d. FIG. 6 is a timing chart for explaining the operation at the moment of reading data in the electronic camera shown in FIG. 1. As shown in FIG. 6, the digital signal decoded by the DPCM decoder 36 is sequentially written in FIFO-E 38a–FIFO-H 38d with respective clock signals WEE–WEH having a frequency ½ fs. The writing is completed during a period 8 tF. After the completion of the writing (the timing of τ11 in FIG. 6), reading from FIFO-E 38a–FIFO-F 38b is performed. The frequency for respective read clock signals REE and REF for the FIFO-E 38a and the FIFO-F 38b is 2 fs, and the frequency for respective read clock signals REG and REH for the FIFO-G 38c and the FIFO-H 38d is fs. The FIFO-E 38a and the FIFO-F 38b are alternatively set to a read state for every ½ frame, and the FIFO-G 38c and the FIFO-H 38d are repeatedly read for every one frame.

The digital luminance signal Y for one frame is thereby repeatedly input to a digital-analog (D/A) converter 40a for every one frame period after τ11, and the color difference signals $C_N$ and $C_W$ for one frame are repeatedly input to D/A converters 40b and 40c for every one frame period. Return components in the outputs from the D/A converters 40a, 40b and 40c are removed at LPF's 42a, 42b and 42c, respectively, and the resultant signals are made composite television signals at a composite signal producing circuit 44, and are output from an output terminal 46 as still-picture signals.

In the electronic camera according to the present embodiment as described above, since a data rate for write/read at the moment of dubbing is 16 times a data rate for write/read at the moment of a photographing operation, it is possible to perform dubbing with an extremely high speed, and to provide sufficient time for digital signal processing at the moment of photographing and reproducing operations. Particularly, since the camera has a configuration in which the amount of data is compressed by high-efficiency coding at the moment of storage, sufficient time is allowed for the high-efficiency coding. Furthermore, at the moment of dubbing, since dubbing can be performed with a small amount data subjected to high-efficiency coding, the time required for dubbing can be further minimized.

Although, in the above-described embodiment, the camera has a configuration in which a luminance signal and color difference signals are sequentially writ tell in and read from a memory unit by a single line, the present invention can also be applied to a configuration in which the signals are written and read in parallel using a plurality of lines.

In the above-described embodiment, the data rate is reduced because of high-efficiency coding. However, even when high-efficiency coding is not performed, it is also possible to provide the same effects as described above.

What is claimed is:

1. A digital image data processing apparatus, comprising:

storage means for storing digital image data in a storage medium;

digital data forming means for imaging an object, and for forming and outputting digital data corresponding to the image of the object;

encoding means for encoding the digital data to form first digital image data and for outputting the first digital image data;

digital image data supplying means for selectively supplying said storage means with one of said first digital image data outputted from said encoding means and second digital image data which is externally input to the apparatus so that the second digital image data bypasses the encoding means;

storage operation control means for controlling a storage operation of said storage means to cause the first digital image data to be stored in the storage medium according to a first storage mode if said first digital image data is supplied to said storage means, and to cause the second digital image data to be stored in the storage medium according to a second storage mode if said second digital image data is supplied to said storage means, said second storage mode having a data storage rate higher than that of the first storage mode;

read operation control means having a first read mode for reading out the digital image data stored in the storage medium at a first data read rate, and a second read mode for reading out the digital image data stored in the storage medium at a second data rate which is higher than that of the first data read rate, said read operation control means controlling an operation for selectively reading out data from the storage medium in accordance with one of the first or second read modes;

decoding means for decoding the digital image data read out from the storage medium and for outputting decoded digital image data corresponding to the digital image data read out from the storage medium; and data output means for supplying to said decoding means the digital image data read out of said storage medium according to the first read mode, and for supplying to an outside of said apparatus the digital image data read out from said storage medium according to the second read mode without processing the read data by said decoding means.

2. A digital image data processing apparatus according to claim 1, wherein said storage medium is arranged so as to be detachably mounted on said apparatus.

3. A digital image data processing apparatus according to claim 1, wherein said encoding means is arranged to DPCM encode the digital data output from said digital data forming means to form the first digital image data.

4. A digital image data processing apparatus, comprising:

storage means for storing digital image data in a storage medium;

reading operation control means having a first data reading mode in which digital image data stored in the storage medium is read out at a first data reading rate and a second data reading mode in which digital image data stored in the storage medium is read out at a second data reading rate higher than said first data reading rate, said reading operation control means being arranged to control an operation for reading digital image data from the storage medium selectively in accordance with one of said first and second data reading modes;

decoding means for decoding digital image data read from the storage medium and for outputting decoded digital image data;

analog image signal forming means for forming analog image signals from the decoded digital image data output from said decoding means; and data output means for delivering to said decoding means the digital image data which has been read in said first data reading mode, and for delivering to an external output of said apparatus the digital image data which has been read in said second data reading mode so that the digital image data bypasses the decoding means in the second data reading mode.

5. A digital image data processing apparatus according to claim 4, wherein said storage medium is arranged so as to be detachably mounted on said apparatus.

6. A digital image data processing apparatus according to claim 4, wherein said decoding means is arranged to perform DPCM decoding of said digital image data read from said storage medium in said first data reading mode and to output decoded digital image data.

7. A digital image data processing apparatus, comprising:

storage means for storing digital image data in a storage medium;

digital data forming means for imaging an object, and for forming and outputting digital data corresponding to the image of the object;

encoding means for encoding the digital data to form first digital image data;

digital image data supplying means for selectively supplying said storage means with one of the first digital image data from said encoding means and second digital image data which is externally input to said apparatus so that the second digital image data bypasses said encoding means;

data storage operation control means which controls an operation for storing digital image data such that, when said storage means is supplied with the first digital image data, the first digital image data is stored in the storage medium in a first storage mode, and, when said storage means is supplied with the second digital image data, the second digital image data is stored in the storage medium in a second storage mode that has a higher storage rate than the first storage mode;

reading operation control means having a first data reading mode in which digital image data stored in the storage medium is read out at a first data reading rate and a second data reading mode in which digital image data stored in the storage medium is read out at a second data reading rate higher than the first data reading rate, said reading operation control means being arranged to control an operation for reading digital image data from the storage medium selectively in accordance with one of the first and second data reading modes;

decoding means for decoding digital image data read from the storage medium and for outputting decoded digital image data;

analog image signal forming means for forming analog image signals from the decoded image data output from said decoding means; and data output means for delivering to said decoding means digital image data that has been read in the first data reading mode, and for delivering to an external output of said apparatus digital image data that has been read in the second data reading mode so that the digital image data bypasses said decoding means in the second data reading mode.

8. A digital image data processing apparatus according to claim 7, wherein said apparatus further comprises means for detachably mounting the storage medium.

9. A digital image data processing apparatus according to claim 7, wherein said encoding means comprises means for performing DPCM encoding of the digital data output from said digital data forming means to form the first digital image data.

10. A digital image data processing apparatus according to claim 7, wherein said decoding means comprises means to perform DPCM decoding of the digital image data read from the storage medium in the first data reading mode and for outputting decoded digital image data.

11. A digital image data processing apparatus for use with a storage medium, comprising:

storage means for storing digital image data in the storage medium;

digital image data generating means for processing image data and for generating first digital image data;

digital image data supplying means for selectively supplying said storage means with one of (i) said first digital image data generated by said digital image data generating means and (ii) second digital image data which is externally input to said apparatus and supplied directly to the storage medium free from being processed by said apparatus;

storage operation control means for controlling a storage operation of said storage means to cause the first digital image data to be stored in the storage medium according to a first storage mode if said first digital image data is supplied to said storage means, and to cause the second digital image data to be stored in the storage medium according to a second storage mode, if said second digital image data is supplied to said storage means by said digital image data supplying means, said second storage mode having a data storage rate higher than that of the first storage mode;

read operation control means having a first read mode for reading out the digital image data stored in the storage medium at a first data read rate, and a second read mode for reading out the digital image data stored in the storage medium at a second data rate which is higher than that of the first data read rate, said read operation control means controlling an operation for selectively reading out data from the storage medium in accordance with one of the first or second read modes;

decoding means for decoding the digital image data read out from the storage medium, and for outputting decoded digital image data corresponding to the digital image data read out from the storage medium; and data output means for supplying to said decoding means the digital image data read out of said storage medium according to the first read mode, and for supplying to an outside of said apparatus the digital image data read out from said storage medium according to the second read mode without processing the read data by said decoding means.

12. Apparatus according to claim 11, wherein the storage medium is detachably mountable to said apparatus.

13. Apparatus according to claim 11, wherein said digital image data generating means includes image pickup means.

14. Apparatus according to claim 13, wherein said image pickup means includes an image pickup section for picking up an image of an object, and for generating a digital image signal corresponding to the picked-up image.

15. A digital image data processing apparatus for use with a storage medium, comprising:

storage means for storing digital image data in the storage medium;

encoding means for receiving digital image data, for encoding the received digital image data, and for outputting first digital information corresponding to the encoded received digital image data;

digital image data supplying means for selectively supplying said storage means with one of (i) said first digital image data output from said encoding means and (ii) second digital image data supplied from outside said apparatus and not processed by said encoding means;

storage operation control means for controlling a storage operation of said storage means to cause the first digital image data to be stored in said storage medium according to a first storage mode if the first digital image data is supplied to said storage means, and for causing the second digital image data to be stored in the storage medium according to a second storage mode if the second digital image data is supplied to said storage means, said second storage mode having a data storage rate higher than that of the first storage mode;

read operation control means having a first read mode for reading out the digital image data stored in the storage medium at a first data read rate, and a second read mode for reading out the digital image data stored in the storage medium at a second data read rate which is higher than the first data read rate, said read operation control means controlling an operation of selectively reading out from the storage medium the digital image data according to either one of the first or second read modes;

decoding means for decoding the digital image data read out from the storage medium, and for outputting decoded digital image data corresponding to the digital image data read out from the storage medium; and data output means for supplying to said decoding means the digital image data read out of said storage medium according to the first read mode, and for supplying to an outside of said apparatus the digital image data read out of said storage medium according to the second read mode without processing the read data by said decoding means.

16. Apparatus according to claim 15, wherein the storage medium is detachably mountable to said apparatus.

17. Apparatus according to claim 15, wherein said encoding means comprises a DPCM encoder.

18. Apparatus according to claim 16, wherein said decoding means decodes the digital image data read out from the storage medium according to the first data read mode.

19. Apparatus according to claim 15, wherein said encoding means outputs the first digital image data by encoding the received digital image data in a differential encoding process.

20. Apparatus according to claim 19, wherein said decoding means decodes the digital image data read out from the storage medium according to the first data read mode in a differential decoding process.

21. A digital image data processing apparatus, comprising:

storage means for storing digital image data in a storage medium;

reading operation control means having a first data read mode in which digital image data stored in a storage medium is read out at a first data reading rate and a second data read mode in which digital image data stored in the storage medium is read out at a second data reading rate which is higher than the first data reading rate, said reading operation control means controlling an operation for reading digital image data from the storage medium selectively in accordance with one of said first and second data read modes;

decoding means for decoding digital image data read from the storage medium and for outputting decoded digital image data; and data output means for delivering to said decoding means the digital image data which has been read in said first data read mode, and for delivering to an external output of said apparatus the digital image which has been read in said second data read mode so that the digital image data bypasses the decoding means in the second data read mode.

22. Apparatus according claim 21, further comprising means for detachably mounting the storage medium.

23. Apparatus according claim 21, wherein said decoding means performs DPCM decoding of the digital image data read from the storage medium in the first data read mode and outputs the decoded digital image data.

24. A digital image data processing apparatus, comprising:

storage means for storing digital image data in a storage medium;

digital data forming means for imaging an object, and for forming and outputting digital data corresponding to the image of the object;

encoding means for encoding the digital data to form first digital image data;

digital image data supplying means for selectively supplying the storage medium with one of the first digital image data from the encoding means and second digital image data which is externally input to the apparatus so that the second digital image data bypasses the encoding means;

data storage operation control means for controlling an operation for storing digital image data such that, when the storage means is supplied with the first digital image data, the first digital image data is stored in the storage medium in a first storage mode, and, when said storage means is supplied with the second digital image data, the second digital image data is stored in the storage medium in a second storage mode that has a higher storage rate than the first storage mode;

reading operation control means having a first data reading mode in which digital image data stored in the storage medium is read out at a first data reading rate and a second data reading mode in which digital image data stored in the storage medium is read out at a second data reading rate which is higher than the first data reading rate, said reading operation control means reading digital image data from the storage medium selectively in accordance with one of the first and second data reading modes;

decoding means for decoding digital image data read from the storage medium and for outputting decoded digital image data; and data output means for delivering to said decoding means digital image data which has been read in the first data reading mode, and for delivering to an external output of the apparatus digital image data that has been read in the second data reading mode so that the digital image data bypasses said decoding means in the second data reading mode.

25. Apparatus according to claim 24, further comprising means for detachably mounting the storage medium.

26. Apparatus according to claim 24, wherein said encoding means comprises means for DPCM encoding the digital data output from the digital data forming means to form the first digital image data.

27. Apparatus according to claim 24, wherein said decoding means comprises means to DPCM decode the digital image data read from the storage medium in the first data reading mode and for outputting decoded digital image data.

* * * * *

UNITED STATES PATENT AND TRADEMARK OFFICE
CERTIFICATE OF CORRECTION

PATENT NO. : 5,583,567

DATED : December 10, 1996

INVENTOR(S) : Nagasawa, et al.

It is certified that error appears in the above-indentified patent and that said Letters Patent is hereby corrected as shown below:

COLUMN 1

Line 52, "provide copy of" should read --copy--.

COLUMN 2

Line 51, "a" should read --of a--;

Line 56, "in" (first occurance) should read --in the--;

Line 67, "invention in" should read --invention. In--.

COLUMN 3

Line 18, "2 rs" should read --2 fs--;

Line 24, "(FIFO's )" should read --(FIFO's)--;

Line 29, "converter" should read --converters--;

Line 52, "stages in" should read --stages. In--.

COLUMN 4

Line 16, "codes," should read --codes.--.

UNITED STATES PATENT AND TRADEMARK OFFICE
CERTIFICATE OF CORRECTION

PATENT NO. : 5,583,567
DATED : December 10, 1996
INVENTOR(S) : Nagasawa, et al.

It is certified that error appears in the above-indentified patent and that said Letters Patent is hereby corrected as shown below:

COLUMN 5

Line 15, "DPCH" should read --DPCM--;

Line 37, "lock" should read --clock--;

Line 56, "The" should be deleted.

COLUMN 6

Line 44, "amount" should read --amount of--;

Line 49, "writ tell" should read --written--.

COLUMN 7

Line 15, "second storage..." should not be a paragraph.

UNITED STATES PATENT AND TRADEMARK OFFICE
CERTIFICATE OF CORRECTION

PATENT NO. : 5,583,567
DATED : December 10, 1996
INVENTOR(S) : Nagasawa, et al.

It is certified that error appears in the above-indentified patent and that said Letters Patent is hereby corrected as shown below:

COLUMN 11

Line 11, "according" should read --according to--;

Line 13, "according" should read --according to--.

Signed and Sealed this

Third Day of June, 1997

Attest:

BRUCE LEHMAN

*Attesting Officer*   Commissioner of Patents and Trademarks